(12) United States Patent
Furuya

(10) Patent No.: US 7,395,486 B2
(45) Date of Patent: Jul. 1, 2008

(54) IMAGE COMMUNICATION SYSTEM USING A HIERARCHICAL CODE COMPRISED OF A PLURALITY OF LAYERS

(75) Inventor: Yukitsuna Furuya, Tokyo (JP)

(73) Assignee: NEC Corporation, Tokyo (JP)

( * ) Notice: Subject to any disclaimer, the term of this patent is extended or adjusted under 35 U.S.C. 154(b) by 391 days.

(21) Appl. No.: 10/924,216

(22) Filed: Aug. 24, 2004

(65) Prior Publication Data
US 2005/0050430 A1    Mar. 3, 2005

(30) Foreign Application Priority Data
Aug. 29, 2003   (JP)   ............... 2003-306455

(51) Int. Cl.
*H03M 13/00*   (2006.01)
(52) U.S. Cl. .................. 714/758; 714/752; 714/786
(58) Field of Classification Search ................ 714/758, 714/753, 776, 755, 756, 702, 752, 786; 375/295
See application file for complete search history.

(56) References Cited

U.S. PATENT DOCUMENTS

| | | | | |
|---|---|---|---|---|
| 5,668,810 | A * | 9/1997 | Cannella, Jr. | ............... 370/392 |
| 5,771,081 | A | 6/1998 | Lee | |
| 6,122,265 | A * | 9/2000 | Nakamura et al. | .......... 370/332 |
| 6,243,469 | B1 * | 6/2001 | Kataoka et al. | ............. 380/255 |
| 6,292,591 | B1 * | 9/2001 | Kondo | ....................... 382/240 |
| 6,317,462 | B1 * | 11/2001 | Boyce | .................... 375/240.27 |
| 6,490,705 | B1 * | 12/2002 | Boyce | ........................ 714/776 |
| 6,516,436 | B1 * | 2/2003 | Dave et al. | .................. 714/753 |
| 6,590,902 | B1 * | 7/2003 | Suzuki et al. | ............... 370/465 |
| 6,901,159 | B2 * | 5/2005 | Baertsch et al. | ............. 382/132 |
| 2005/0063596 | A1 * | 3/2005 | Yomdin et al. | .............. 382/232 |

FOREIGN PATENT DOCUMENTS

JP   1997-4926   4/1997

OTHER PUBLICATIONS

Tdoc MBMS-0033 Scalable Multimedia Broadcast and Multicast Service (MBMS), MBMS Workshop, Agenda 5, London, England May 6-7, 2002, Samsung Electronics.

* cited by examiner

*Primary Examiner*—Jacques Louis-Jacques
*Assistant Examiner*—Fritz Alphonse
(74) *Attorney, Agent, or Firm*—Young & Thompson

(57) ABSTRACT

A system for efficiently utilizing a transmission capacity without complicated processing a hierarchical code comprised of a plurality of layers having different error correcting capabilities. In a transmitter, an encoding unit encodes an image in accordance with a hierarchical coding scheme to generate a plurality of layer data. An error correcting code addition unit performs error correction coding on each of at least one layer data including the lowermost layer data in accordance with an error correction coding scheme which gives higher error correcting capabilities to a lower layer than a higher layer. A transmission unit transmits each of the layer data and error correcting codes onto a transmission path. A receiver corrects possible errors introduced on the path into the layer data received from the transmitter according to the error correction coding scheme, and decodes layer data received in a quality available for decoding to restore the image.

20 Claims, 5 Drawing Sheets

IMAGE COMMUNICATION SYSTEM USING A HIERARCHICAL CODE COMPRISED OF A PLURALITY OF LAYERS

BACKGROUND OF THE INVENTION

1. Field of the Invention

The present invention relates to image communications, and more particularly, to techniques for transmitting the same image to a plurality of terminals under different communication conditions.

2. Description of the Related Art

In recent years, image communications, more specifically, broadcast or multicast of image data has grown in importance in the field of mobile communications. In 3GPP (3rd Generation Partnership Project), the broadcast and multicast of image data have been under investigation for providing MBMS (Multimedia Broadcast and Multicast Service).

Since image data has a larger amount of data than conventional audio data, it is required to efficiently transfer the image data within a limited communication capacity of mobile communications. A conventional system which broadcasts or multicasts image data encodes images using a hierarchical coding scheme for transfer from a base station to mobile terminals of a CDMA (Code Division Multiple Access) mobile communication (see, for example, an article "Tdos MBMS-0033, "Scalable Multimedia Broadcast and Multicast Service (MBMS)", Samsung Electronics, 3GPP MBMS Workshop, London, UK, May 6-7, 2002).

According to this article, an image is encoded into data comprised of two layers (a base layer and an enhanced layer). Data in the respective layers generated by the encoding are called "base layer data" and "enhanced layer data," respectively. The base layer data has a high importance level for restoring the image, and the image can be generated even by decoding only the base layer data. However, an image generated only from the base layer data is inferior in resolution to an image generated by decoding both the base layer data and enhanced layer data.

In the system of the foregoing article, the base layer data alone is transmitted with large power so that all mobile terminals within a cell can satisfactorily receive the base layer data. On the contrary, the enhanced layer data is transmitted with power small enough to be satisfactorily received only by mobile terminals under good communication conditions, such as those situated near the base station. This strategy reduces the total transmission power in the system to efficiently utilize the communication capacity in the CDMA communication.

Referring to FIG. 1, a conventional mobile communication system comprises core network (CN) 91, and a radio access network (RAN) 94. Server 95 is connected to CN 91, while user equipment (UE) 96, 97 can be connected to RAN 94. Assume herein that image data is broadcast or multicast from server 95 to UE 96, 97.

CN 91, which is a core of a mobile communication network, typically includes a plurality of switches (not shown) and can set an arbitrary communication route. RAN 94, which is responsible for accesses to the mobile communication network, includes radio network controller (RNC) 92 and base station device (Node-B) 93. Node-B 93 connects with UE 96, 97 over the air within a cell covered thereby to provide a radio channel for communications between UE 96, 97 and a partner device (here, server 95). RNC 92 is responsible for a variety of settings and control for Node-B 93, and for a calling process for establishing communications between UE 96, 97 and the partner device.

Server 95 encodes an image in accordance with an encoding scheme which involves two layers with different importance levels when it broadcasts or multicasts image data to UE 96, 97. This encoding results in generation of base layer data 98 and enhanced layer data 99.

Base layer data 98 and enhanced layer data 99 are sent from Node-B 93 through CN 91 and RNC 92. In this event, base layer data 98 and enhanced layer data 99 are transmitted through physical radio channels different from each other. Also, these radio channels are transmitted with transmission powers different from each other, depending on the importance level of each layer. Base layer data 98 is transmitted with higher transmission power than enhanced layer data 99 because base layer data 98 has a higher importance level.

Upon satisfactory receipt of both base layer data 98 and enhanced layer data 99, each UE 96, 97 displays a high resolution image using both data in decoding. On the other hand, when UE 96, 97 cannot satisfactorily receive enhanced layer data 99 but can satisfactorily receive only base layer data 98, each UE 96, 97 displays a low resolution image by decoding base layer data 98.

In FIG. 1, UE 96 is under good communication conditions, because it is located near Node-B 93, and can therefore satisfactorily receive both base layer data 98 and enhanced layer data 99. On the other hand UE 97 is under bad communication conditions because it is located far from Node-B 93, though located within the cell covered by Node-B 93, and can therefore satisfactorily receive only base layer data 98 which has higher transmission power. As a result, UE 96, under good communication conditions, can display a high resolution image, and UE 97, under bad communication conditions, can also display an image though the resolution is lower than that of the image displayed by UE 96.

As described above, the conventional system has the ability to efficiently utilize the communication capacity by ensuring that an image is displayed even on UE under bad communication conditions, while degrading the resolution of the image, to reduce the total transmission power.

However, the foregoing conventional system has the following problems.

In the conventional system illustrated in FIG. 1, one image is encoded into two data, i.e., base layer data and enhanced layer data which are transferred through different paths from each other, so that the system requires a call control which handles these data in pair. For this reason, extra processing must be added to CN 91, RNC 92, and UE 96, 97.

Also, since base layer data and enhanced layer data of the same image pass CN 91 through different paths, a difference in delay must be absorbed before the image is decoded. Further, although the Internet may be connected to CN 91 through a gateway so that server 95 is connected to the Internet, the difference in delay is even increased in such a configuration. Thus, a buffer for temporality storing data is required for RNC 92 or UE 96, 97 in order to absorb the difference in delay. Furthermore, RNC 92 or UE 96, 97 requires extra processing for synchronizing the data using the buffer.

SUMMARY OF THE INVENTION

It is an object of the present invention to provide an image communication method, an image communication system, an image transmitter, and an image receiver which are capable of efficiently utilizing the communication capacity without requiring complicated processing.

To achieve the above object, the image communication system of the present invention includes a transmitter and a receiver. The transmitter encodes an image in accordance with a hierarchical coding scheme to generate a plurality of layer data, and performs error correction coding on each of at least one layer data including the lowermost layer data in accordance with an error correction coding scheme which gives higher correction capabilities to a lower layer than a higher layer, and transmits a plurality of layer data including the layer data subjected to the error correction coding onto a transmission path. The receiver corrects possible errors introduced on the transmission path into the layer data received from the transmitter in accordance with the error correction coding scheme, and decodes layer data received in a quality available for decoding to restore the image.

Thus, according to the image communication system of the present invention, the transmitter adds an error correcting code to each layer data generated in accordance with the hierarchical coding scheme to provide higher error correction capabilities for lower layer data, and transmits the layer data, while the receiver restores an image using layer data received in a quality available for decoding, as a result of error correction. Thus, the image communication system can ensure that the image is displayed on a receiver under bad communication conditions, while degrading the image quality thereof, thereby reducing the total transmission power.

The above and other objects, features, and advantages of the present invention will become apparent from the following description with reference to the accompanying drawings which illustrate examples of the present invention.

EMBODIMENTS

Figure 1:
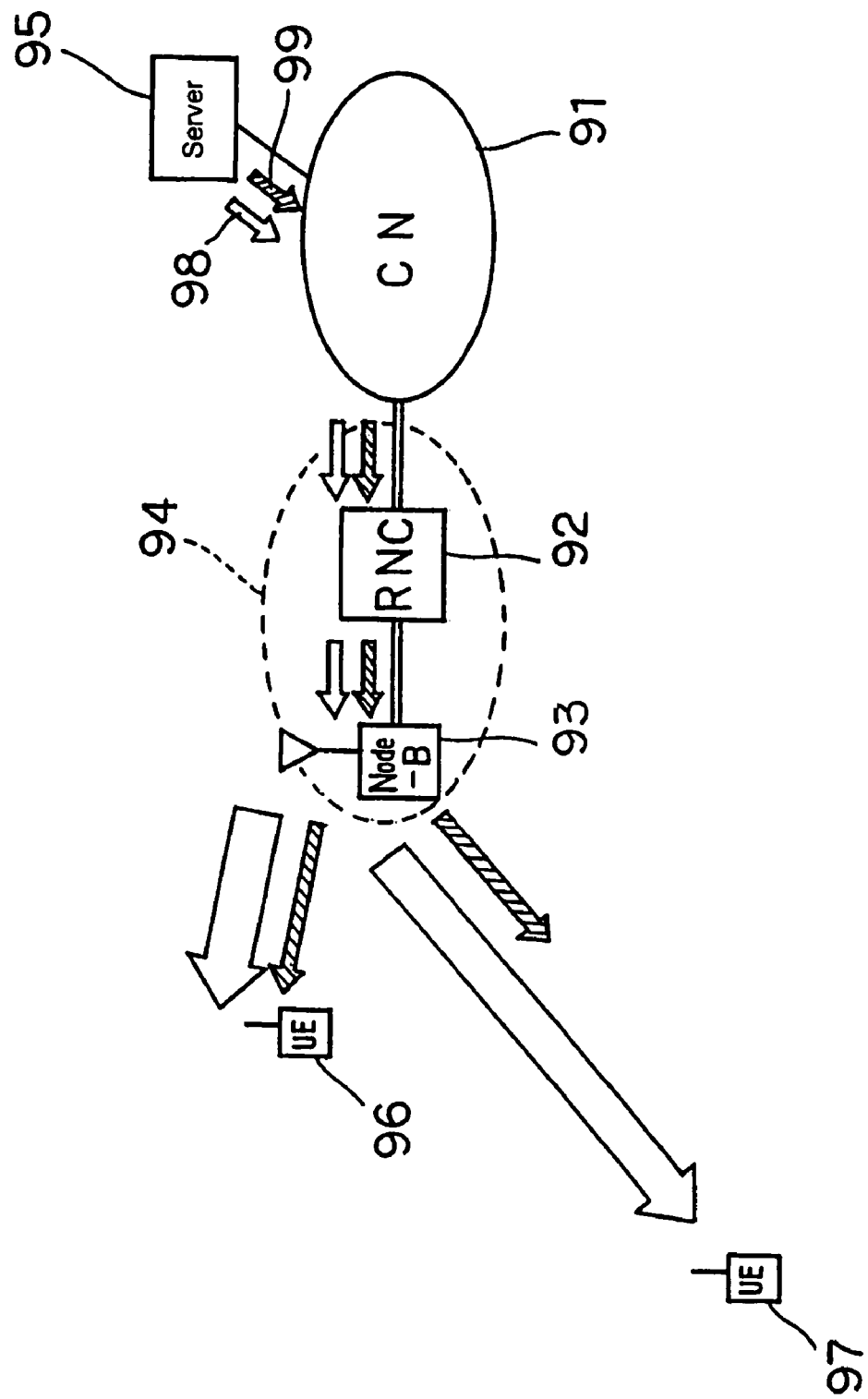
FIG. 1 is a block diagram illustrating a conventional mobile communication system.
Figure 2:
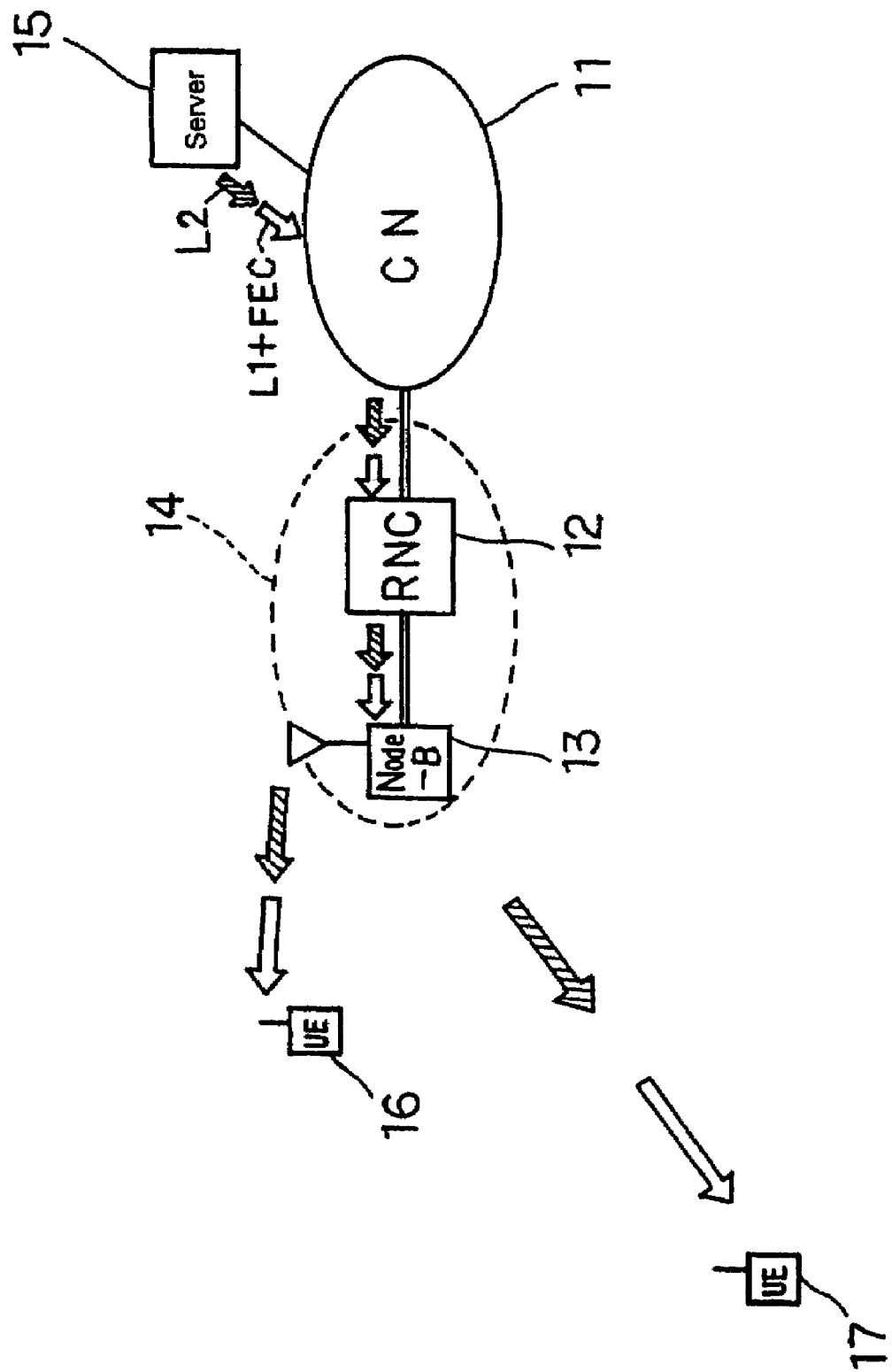
FIG. 2 is a block diagram illustrating a mobile communication system according to one embodiment of the present invention.

Referring to FIG. 2, a mobile communication system according to one embodiment of the present invention comprises core network (CN) 11, and radio access network (RAN) 14. Server 15 is connected to CN 11, while user equipment (UE) 16, 17 can be connected to RAN 14. Assume herein that image data is broadcast or multicast from server 15 to UE 16, 17.

CN 11, which is the core of a mobile communication network, typically includes a plurality of switches (not shown) and can set an arbitrary communication route. RAN 14, which is responsible for accesses to the mobile communication network, includes radio network controller (RNC) 12 and base station device (Node-B) 13. Node-B 13 connects with UE 16, 17 over the air within a cell covered thereby to provide a radio channel for communications between UE 16, 17 and a partner device (here, server 15). RNC 12 is responsible for a variety of settings and control for Node-B 13, and for a calling process for establishing communications between UE 16, 17 and the partner device.

Figure 3:
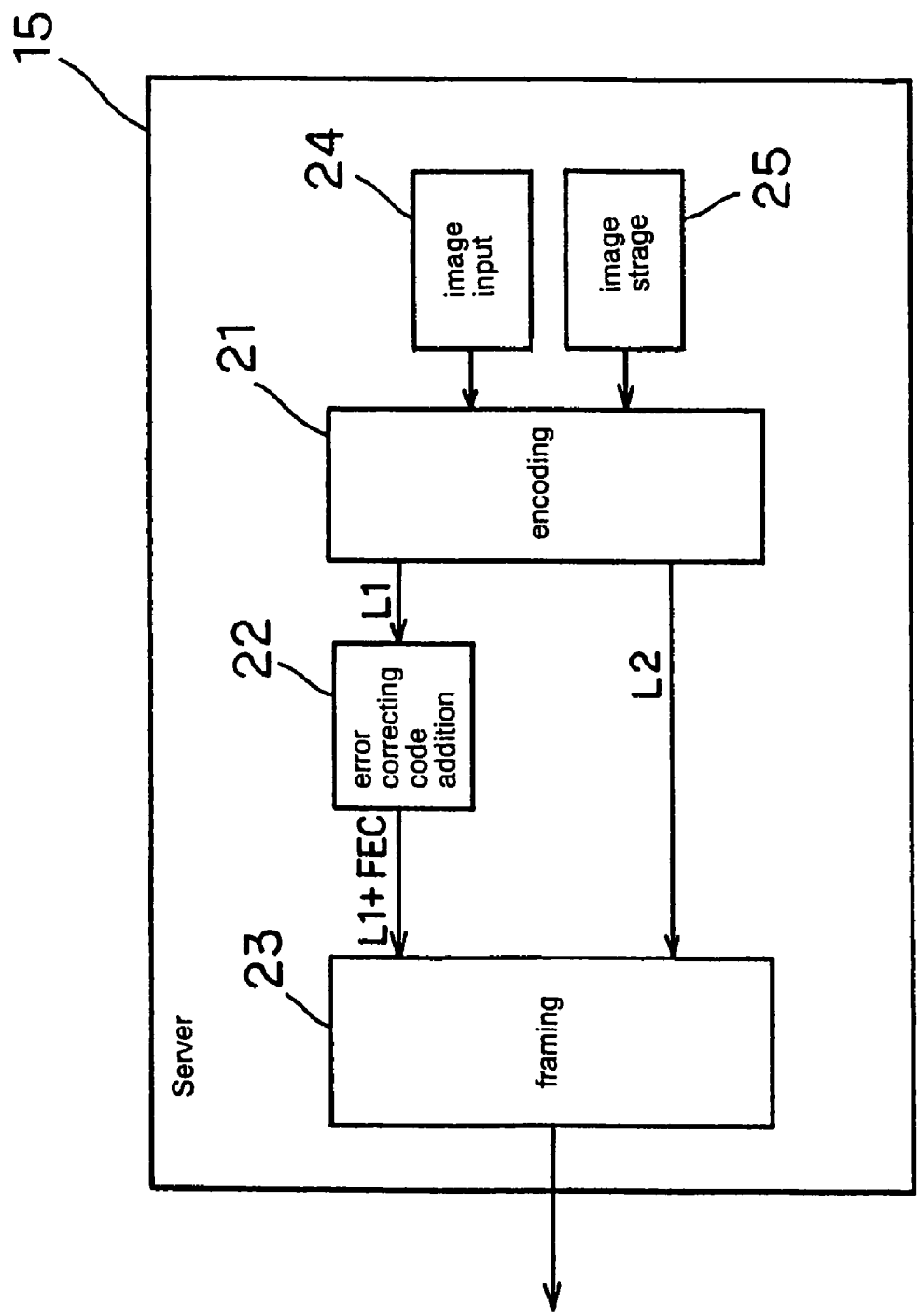
FIG. 3 is a block diagram illustrating a server shown in FIG. 2.

Referring to FIG. 3, server 15 comprises encoding unit 21, error correcting code addition unit 22, framing unit 23, image input unit 24, and image storage unit 25.

Encoding unit 21 encodes image data applied from image input unit 24 or image data recorded in image storage unit 25 into a code comprised of two layers having different importance levels to generate two layer data in accordance with a hierarchical coding scheme. Here, the hierarchical coding scheme encodes an image into data in a plurality of layers having different importance levels. In this embodiment, data in a plurality of layers encoded in accordance with the hierarchical coding scheme can be decoded into an image using data in an arbitrary number of layers from the lowermost layer, and a better image can be restored as a larger number of layers are used in the decoding. Also, the importance level used herein refers to the degree to which each layer is required for restoring an image, and a lower layer has a higher importance level in the hierarchical coding scheme. In this embodiment, assume that a layer having a higher importance level is Layer 1, and a layer having a lower importance level is Layer 2. Encoding unit 21 sends Layer 1 data (L1 in FIG. 3) to error correcting code addition unit 22, and sends Layer 2 data (L2 in FIG. 3) to framing unit 23.

An image can be provided even by decoding only Layer 1 data which is in the lowermost layer of the data. However, the image provided from Layer 1 data alone is inferior in image quality to an image provided by decoding both Layer 1 data and Layer 2 data.

It should be noted that an image sent in the image communication of this embodiment might be a still image or a moving image. Also, the image quality used herein widely refers to the quality of a still image or a moving image, and includes smoothness of motion (temporal resolution) and the like when a moving image is concerned, in addition to reproductivity of an original image including, for example, the resolution and color.

Figure 4:
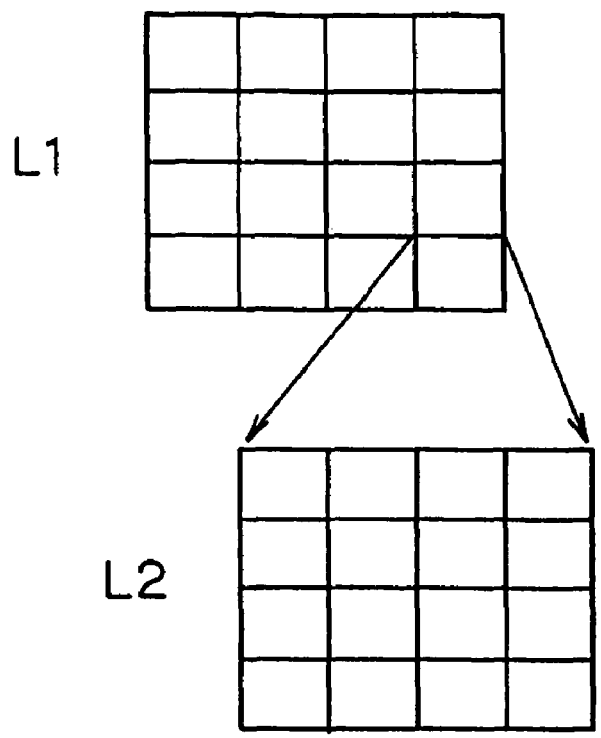
FIG. 4 is a diagram for describing an exemplary hierarchical coding scheme.

FIG. 4 is a diagram for describing an example of the hierarchical coding scheme. In Layer 1, image is encoded at a predetermined resolution. In Layer 2, each of pixels in Layer 1 is further sub-divided to encode the image at a higher resolution. While the image can be produced by decoding Layer 1 data alone, the resulting image has a lower resolution than the image produced using Layer 1 data and Layer 2 data.

Error correcting code addition unit 22 adds an error correcting code (FEC in FIG. 3) to Layer 1 data from encoding unit 21, and sends the resulting data to framing unit 23.

Framing unit 23 combines Layer 1 data to which the error correcting code was added in error correcting code addition unit 22 with layer 2 data from encoding unit 21 into a frame which is sent to CN 11.

Figure 5:
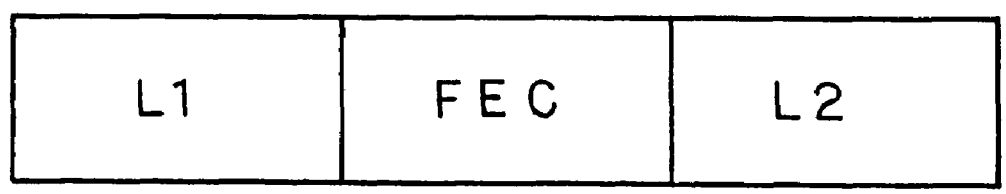
FIG. 5 is a diagram illustrating an exemplary structure of a frame which is sent from a server to mobile terminals.

FIG. 5 is a diagram illustrating an exemplary structure of the frame sent from the server to mobile terminals. Referring to FIG. 5, one frame includes Layer 1 data (L1), an error correcting code (FEC) added thereto, and Layer 2 data (L2). Since Layer 1 data, error correcting code added thereto, and Layer 2 data are sent through the same physical radio channel, CN11, RNC 12, Node-B 13 need not be conscious that an image is comprised of data in a plurality of layers, and therefore eliminate the need for the absorption of difference in delay and special processing. Also, the transmission power need not be adjusted for each radio channel, as is required in the conventional system in which Layer 1 data and Layer 2 data are sent through different radio channels, thus facilitating the processing of RNC 12 and Node-B 13.

The frame including Layer 1 data and Layer 2 data is sent from Node-B 13 through CN 11 and RNC 12. In this event, the transmission power of the radio channel is adjusted to an appropriate value.

UE 16, which is located near Node-B 13 and therefore is in a good communication state, can receive Layer 2 data without error correction in a quality available for decoding (for example, free of error) in addition to Layer 1 data with error correction. On the other hand, UE 17, which is located far away from Node-B 13 and therefore is in a bad communication state, can receive only Layer 1 data in a quality available for decoding by performing the error correction.

Figure 6:
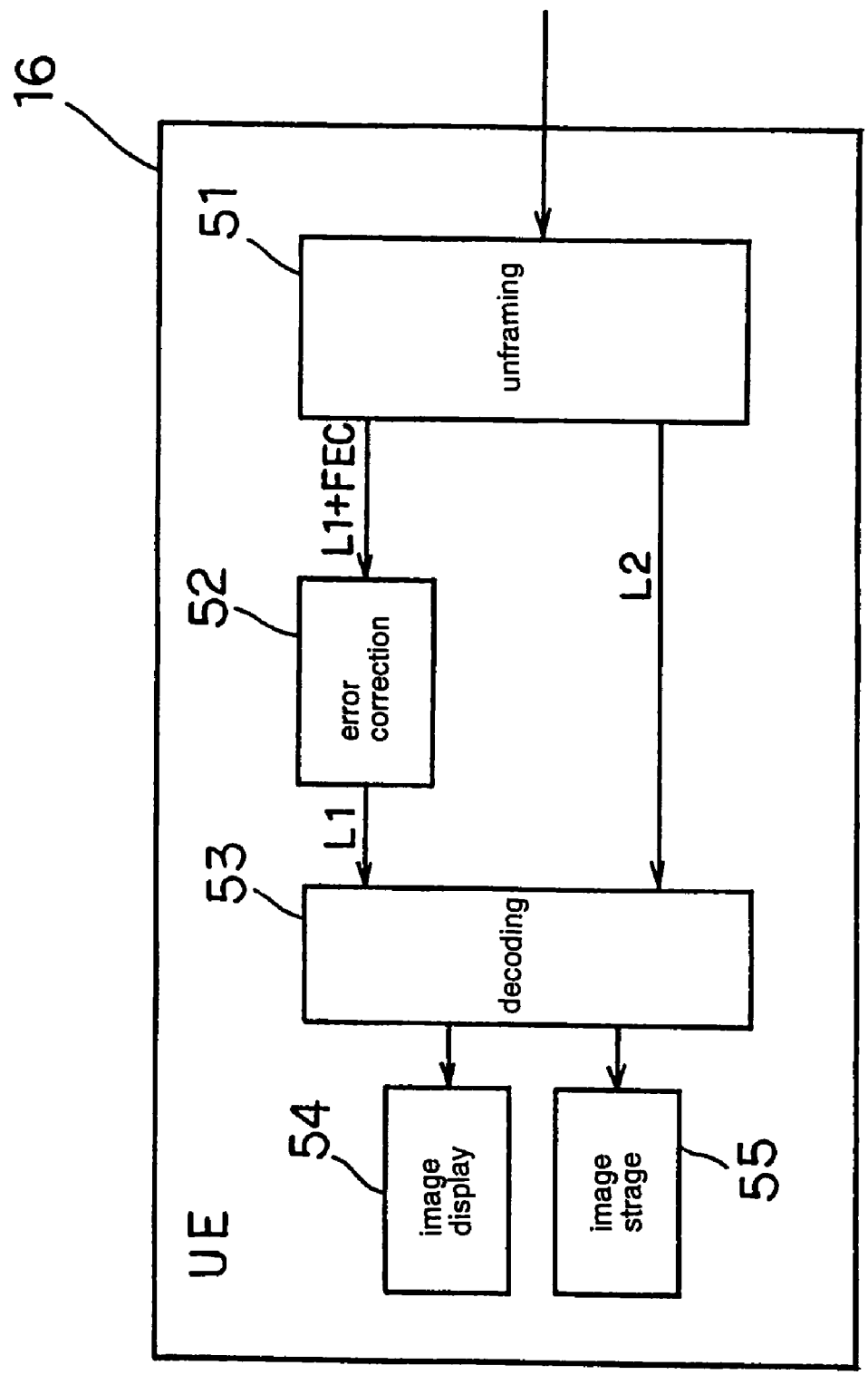
FIG. 6 is a block diagram illustrating a mobile terminal shown in FIG. 2.

Referring to FIG. 6, UE 16 comprises unframing unit 51, error correction unit 52, decoding unit 53, image display unit 54, and image storage unit 55.

Unframing unit 51 receives a frame from server 15 through CN 11 and RAN 14, and extracts Layer 1 data and error correcting code added thereto, and Layer 2 data from the frame. The Layer 1 data and error correcting code added thereto are sent to error correction unit 52. The Layer 2 data is sent to decoding unit 53.

Error correction unit 52 corrects possible errors in the Layer 1 data using the error correcting code, and sends the corrected Layer 1 data to decoding unit 53.

Decoding unit 53 decodes both the Layer 1 data and Layer 2 data, if the Layer 2 data is in a quality available for decoding, to display a high quality image on image display unit 54 or record the image in image storage unit 55. On the other hand, when the Layer 2 data is not in a quality available for decoding, decoding unit 53 does not use the Layer 2 data in the decoding but decodes the Layer 1 data alone.

In FIG. 2, UE 16 is under good communication conditions because it is located near Node-B 13, and can therefore display a high quality image. On the other hand, UE 17 is under bad communication conditions because it is located far away from Node-B 13, and can therefore decode only Layer 1 data and display an image though in a quality lower than that displayed by UE 16.

As described above, the system of this embodiment can correct possible errors in only Layer 1 data having a higher importance level, using the error correcting code, of lower Layer 1 data and higher Layer 2 data to ensure that UE under bad communication conditions can display image anyway with the aid of error correction, while degrading the quality of the displayed image, to reduce the total transmission power. Thus, the system can save the power consumption, and efficiently utilize the communication capacity in the CDMA communication.

While in the foregoing embodiment, the layer (Layer 2) having a lower importance level of the two layers is not given an error correcting code, the present invention is not limited to this way of giving the error correcting code. The layer having a lower importance level may be given an error correcting code which provides lower error correcting capabilities than the error correcting code given to the layer (Layer 1) having a higher importance level.

Also, while the foregoing embodiment has shown an exemplary hierarchical coding scheme which encodes an image into data in two layers, the present invention is not limited to such an encoding scheme that encodes an image into two layer data, but the number of layers may be any plural number. In this event, data in respective layers may be given error correcting codes which provide higher error correcting capabilities in an order in which the data have higher importance levels.

Also, while the foregoing embodiment has shown an example of the basic hierarchical coding scheme in FIG. 4, the present invention is not limited to the illustrated scheme, but may employ any hierarchical coding scheme. Another example of hierarchical coding scheme may employ a quad-tree. Further examples of hierarchical coding scheme may employ progressive JPEG, interlace GIF, or JBIG.

According to the quad-tree based hierarchical coding scheme, each of the vertical and horizontal sides of an image is divided by two, so that the image is divided into four areas. An entirely uniform area is no longer divided, but the remaining areas are each divided again into four areas. By repeating such division, the image can be represented by a small amount of data. The hierarchical coding can be implemented by separating a shallow portion and a deep portion of the quad-tree structure into layers.

Also, the foregoing embodiment has shown an example in FIG. 5 in which the Layer 1 data (L1), error correcting code (FEC), and Layer 2 data (L2) are included in the same frame. The present invention, however, is not limited to this structure of frame. Alternatively, the Layer 1 data and Layer 2 data may be sequentially sent in different frames. Even in this way of transmission, the transmission power need not be adjusted on a channel-by-channel basis because UE 17 in bad communication conditions can receive Layer 1 data in a quality available for decoding with the aid of error correcting, even though UE 17 fails to receive Layer 2 data in a quality available for decoding.

Also, while the foregoing embodiment has illustrated a topology in which server 15 is connected CN 11, the present invention is not limited to this particular topology. For example, another network such as the Internet can be connected to CN 11 through a gateway, and the present invention can also be applied to such a topology.

While preferred embodiments of the present invention have been described using specific terms, such description is for illustrative purposes only, and it is to be understood that changes and variations may be made without departing from the spirit or scope of the following claims.

What is claimed is:

1. An image communication method for sending an image from a transmitter to at least one receiver, said method comprising the steps of:

in said transmitter:
encoding said image in accordance with a hierarchical coding scheme to generate more than two layer data;
performing error correction coding on each of at least two of said layer data including a lowermost of said layer data in accordance with an error correction coding scheme, wherein for all said layer data to which said error correction is applied, higher error correcting capabilities are given to lower layer data; and
sending a plurality of said layer data including layer data subjected to said error correction coding to said receiver, and in each said receiver:
correcting errors introduced on a transmission path into said layer data received from said transmitter in accordance with said error correction coding scheme; and
decoding layer data acquired in a quality available for decoding to restore the image.

2. The image communication method according to claim 1, wherein said transmission path includes a section in which a CDMA (Code Division Multiple Access) scheme is employed.

3. The image communication method according to claim 2, wherein transmission power is variable in said section in which the CDMA (Code Division Multiple Access) scheme is employed, and said layer data and the error correcting codes generated in said error correction coding are transmitted with the same transmission power.

4. The image communication method according to claim 3, wherein each of said layer data and said error correcting codes is sent through the same physical channel on said transmission path.

5. The image communication method according to claim 4, wherein each of said layer data and said error correcting codes is transmitted in the same frame.

6. An image communication system comprising:
a transmitter for encoding an image in accordance with a hierarchical coding scheme to generate more than two layer data, performing error correction coding on each of at least two of said layer data including a lowermost of said layer data in accordance with an error correction coding scheme, wherein for all said layer data to which said error correction is applied, higher error correcting capabilities are given to lower layer data, and sending a plurality of said layer data including layer data subjected to said error correction coding onto a transmission path, and
at least one receiver for correcting errors introduced on a transmission path into said layer data received from said transmitter in accordance with said error correction coding scheme, and decoding layer data acquired in a quality available for decoding to restore the image.

7. The image communication system according to claim 6, further comprising:
a base station device for transmitting each of said layer data and said error correcting codes to a section of said transmission path in which a CDMA (Code Division Multiple Access) scheme is used,
wherein said receiver is a terminal device for receiving said layer data and said error correcting codes from said base station device through the section in which the CDMA scheme is employed.

8. The image communication system according to claim 7, wherein transmission power is variable in said section in which the CDMA (Code Division Multiple Access) scheme is employed, and said base station device transmits each of said layer data and said error correcting codes generated in said error correction coding with the same transmission power.

9. The image communication system according to claim 8, wherein each of said layer data and said error correcting codes is transmitted through the same physical channel on said transmission path.

10. The image communication system according to claim 9, wherein each of said layer data and said error correcting codes is transmitted in the same frame.

11. An image transmitter for sending an image to at least one receiver, comprising:
an encoding unit for encoding said image in accordance with a hierarchical coding scheme to generate more than two layer data;
an error correcting code addition unit for performing error correction coding on each of at least two of said layer data including the lowermost layer data in accordance with an error correction coding scheme, wherein for all said layer data to which said error correction is applied, higher error correcting capabilities are given to lower layer data; and
a transmission unit for sending a plurality of said layer data including layer data subjected to said error correcting codes to said receiver through a transmission path.

12. The image transmitter according to claim 11, wherein said transmission path includes a section in which a CDMA (Code Division Multiple Access) scheme is employed.

13. The image transmitter according to claim 12, wherein transmission power is variable in said section in which the CDMA (Code Division Multiple Access) scheme is employed, and said base station device transmits each of said layer data and said error correcting codes generated in said error correction coding with the same transmission power.

14. The image transmitter according to claim 13, wherein said transmission unit transmits each of said layer data and said error correcting codes though the same physical channel on said transmission path.

15. The image transmitter according to claim 14, wherein said transmission unit transmits each of said layer data and said error correcting codes in the same frame.

16. An image receiver for receiving more than two layer data from a transmitter through a transmission path, said plurality of layer data generated by said transmitter in accordance with a hierarchical coding scheme, and each subjected to error correction coding in accordance with an error correction coding scheme, wherein for all said layer data to which said error correction is applied, higher error correcting capabilities are given to lower layer data, said plurality of more than two layer data received by said receiver including the layer data subjected to the error correction coding, said receiver comprising:
a reception unit for receiving of said layer data;
an error correction unit for correcting errors introduced on said transmission path into said layer data in accordance with said error correction coding, the error correction unit being constructed so as to accommodate an error correction coding scheme in which for all said layer data to which said error correction is applied, higher error correcting capabilities are given to lower layer data; and
a decoding unit for decoding layer data received in a quality available for decoding to restore an image.

17. The image receiver according to claim 16, wherein said transmission path includes a section in which a CDMA (Code Division Multiple Access) scheme is employed.

18. The image receiver according to claim 17, wherein transmission power is variable in said section in which the CDMA (Code Division Multiple Access) scheme is employed, and said base station device transmits each of said layer data and said error correcting codes generated in said error correction coding with the same transmission power.

19. The image receiver according to claim 18, wherein said reception unit receives each of said layer data and said error correcting codes from the same physical channel on said transmission path.

20. The image receiver according to claim 19, wherein said reception unit receives each of said layer data and said error correcting codes in the same frame.

* * * * *